(12) United States Patent
Poon et al.

(10) Patent No.: US 10,398,205 B2
(45) Date of Patent: *Sep. 3, 2019

(54) WATER RESISTANT PROTECTIVE CASE FOR PORTABLE ELECTRONIC DEVICE

(71) Applicant: GRIFFIN TECHNOLOGY, LLC, Irvine, CA (US)

(72) Inventors: Daniel Poon, Nashville, TN (US); Jeff Fielder, Sarasota, FL (US); Aaron Jones, Nashville, TN (US)

(73) Assignee: Griffin Technology, LLC, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/990,438

(22) Filed: May 25, 2018

(65) Prior Publication Data
US 2018/0271244 A1 Sep. 27, 2018

Related U.S. Application Data

(63) Continuation of application No. 15/605,655, filed on May 25, 2017, now Pat. No. 9,980,544, which is a
(Continued)

(51) Int. Cl.
*H04B 1/38* (2015.01)
*A45C 11/00* (2006.01)
(Continued)

(52) U.S. Cl.
CPC ............ *A45C 11/00* (2013.01); *A45C 13/008* (2013.01); *H04B 1/3888* (2013.01);
(Continued)

(58) Field of Classification Search
CPC . A45C 11/00; A45C 13/008; A45C 2011/002; H04B 1/3888; H04B 2001/3894
(Continued)

(56) References Cited

U.S. PATENT DOCUMENTS 7,609,512 B2 * 10/2009 Richardson ........... G06F 1/1626
361/679.41
8,256,612 B1 * 9/2012 Wang ..................... A45C 11/00
206/320
(Continued)

*Primary Examiner* — Chun Hoi Cheung
(74) *Attorney, Agent, or Firm* — Manatt, Phelps & Phillips, LLP

(57) ABSTRACT

A water resistant device case includes a front and back assembly that mate to enclose an electronic device. The front assembly includes a rigid front frame, a touch screen cover bonded to the front frame, an inner bumper attached to the rigid front frame and an elastomeric main seal attached around a periphery of the rigid front frame. The back assembly includes a rigid back frame, an elastomeric over mold formed on an exterior of the back frame and an inner bumper attached to the rigid back frame. A snap tab attached to the rigid back frame mates with a snap hook on the front assembly to hold the front and back assemblies together when the device is enclosed within the case. A main water resistant seal is formed around a perimeter of the front and back assemblies by the elastomeric main seal on the front assembly being held against an inner surface of the rigid back frame. A secondary water resistant seal is formed around a perimeter of the front and back assemblies by an elastomeric secondary sealing member attached around a periphery of the rigid front frame that mates with an exterior surface of the back assembly to form a secondary water resistant seal. A closed cell foam is used to seal apertures associated with the device's audio inputs and outputs.

19 Claims, 5 Drawing Sheets

Related U.S. Application Data continuation of application No. 14/720,476, filed on May 22, 2015, now Pat. No. 9,668,555.

(60) Provisional application No. 62/001,638, filed on May 22, 2014.

(51) Int. Cl.
  *A45C 13/00* (2006.01)
  *H04B 1/3888* (2015.01)

(52) U.S. Cl.
  CPC ...... *H05K 999/99* (2013.01); *A45C 2011/002* (2013.01); *H04B 2001/3894* (2013.01)

(58) Field of Classification Search
  USPC ........... 206/320, 811, 305; 455/575.1, 575.8; 361/679.01, 679.02
  See application file for complete search history.

(56) References Cited

U.S. PATENT DOCUMENTS

| | | | | |
|---|---|---|---|---|
| 8,342,325 B2* | 1/2013 | Rayner | ................. | G06F 1/1626 |
| | | | | 206/320 |
| 8,531,834 B2* | 9/2013 | Rayner | ................. | H01H 13/06 |
| | | | | 361/679.56 |
| 9,300,344 B2* | 3/2016 | Rayner | ................. | H01H 13/06 |
| 9,444,506 B2* | 9/2016 | Lai | ................. | H04B 1/3888 |
| 9,462,099 B2* | 10/2016 | Wilson | ................. | H04M 1/185 |
| 2011/0024315 A1* | 2/2011 | Kim | ................. | H04M 1/18 |
| | | | | 206/320 |
| 2013/0063004 A1* | 3/2013 | Lai | ................. | G06F 1/1688 |
| | | | | 312/223.1 |
| 2013/0146491 A1* | 6/2013 | Ghali | ................. | G06F 1/1626 |
| | | | | 206/320 |
| 2013/0242481 A1* | 9/2013 | Kim | ................. | H05K 5/06 |
| | | | | 361/679.01 |
| 2013/0271902 A1* | 10/2013 | Lai | ................. | H04R 1/02 |
| | | | | 361/679.01 |
| 2013/0294020 A1* | 11/2013 | Rayner | ................. | H05K 5/061 |
| | | | | 361/679.01 |
| 2013/0314863 A1* | 11/2013 | Tanaka | ................. | H04M 1/18 |
| | | | | 361/679.01 |
| 2014/0016217 A1* | 1/2014 | Rayner | ................. | G06F 1/1626 |
| | | | | 359/819 |
| 2014/0206420 A1* | 7/2014 | Neichi | ................. | H04M 1/0249 |
| | | | | 455/575.8 |
| 2015/0062787 A1* | 3/2015 | Wilson | ................. | H04M 1/185 |
| | | | | 361/679.01 |
| 2015/0171912 A1* | 6/2015 | Chao | ................. | H04B 1/3888 |
| | | | | 455/575.8 |

* cited by examiner

WATER RESISTANT PROTECTIVE CASE FOR PORTABLE ELECTRONIC DEVICE

INCORPORATION BY REFERENCE TO RELATED APPLICATIONS

This application is a continuation of U.S. application Ser. No. 15/605,655, filed May 25, 2017, which is a continuation of U.S. application Ser. No. 14/720,476, filed May 22, 2015, which claims benefit under 35 U.S.C. § 119(e) from U.S. Provisional Application No. 62/001,638, filed on May 22, 2014. The above applications are hereby incorporated herein by reference in their entirety and are to be considered as a part of this specification.

BACKGROUND

A wide variety of protective device cases have been invented that provide various levels of protection and water resistance for the enclosed device. One problem with prior art cases is that the more durable, water resistant and protective the case is, the more difficult it is to access the enclosed device. In addition, many device cases make it difficult to access the various controls and features of the device or fail to adequately protect the controls of the device. These problems are magnified for small touch screen devices that are very sensitive, have a limited display area and may require cleaning. Therefore, what is needed is an improved device case that provides a high degree of protection and water resistance while allowing easy access to the screen and controls of the enclosed device.

SUMMARY

An embodiment of the present invention is directed toward a water resistant device case adapted to enclose a portable electronic device. The device case includes a front assembly constructed from a rigid plastic front frame. A touch screen cover is bonded to the rigid plastic front frame that allows a touch screen of the portable electronic device to be used when the portable electronic device is enclosed within the device case. An elastomeric inner bumper is attached to the rigid plastic front frame to provide padding for the enclosed device. An elastomeric main seal is attached around a periphery of the rigid plastic front frame. A front assembly fastener, preferably a snap hook, is attached to the rigid plastic front frame.

The front assembly mates with a back assembly. The back assembly includes a rigid plastic back frame. An elastomeric over mold is formed on an exterior of the rigid plastic back frame and an elastomeric inner bumper is attached to an interior surface of the rigid plastic back frame. A back assembly fastener, preferably a snap tab, attached to the rigid plastic back frame mates with the front assembly fastener to hold the front assembly and the back assembly together when the portable electronic device is enclosed within the device case.

A main seal is formed around a perimeter of the front and back assembly by the elastomeric main seal on the front assembly being held against an inner surface of the rigid plastic back frame by the fastening members on the front and back assemblies. A secondary seal is formed around a perimeter of the front and back assembly by the front assembly being held against the back assembly by the fastening members on the front and back assemblies. The secondary seal can be formed by an elastomeric secondary sealing member attached around a periphery of the rigid plastic front frame that mates with an exterior surface of the back assembly to form the secondary seal. Alternatively, the secondary seal can be formed between a surface of the rigid plastic front frame and a sealing protrusion positioned on a portion of the elastomeric over mold that extends over an upper edge of the rigid plastic back frame.

The front and back assemblies include apertures corresponding to the audio inputs and outputs of the electronic device that are covered and sealed by a closed cell foam. The front assembly and back assembly also include apertures corresponding to a port of the portable electronic device and a removable elastomeric port cover that removably covers the apertures. The removable elastomeric port cover includes an attachment protrusion that creates a compression fit between the elastomeric cover and an exterior of the device case that seals the port apertures.

DETAILED DESCRIPTION OF THE EMBODIMENTS

The present invention is directed toward a water resistant protective case for enclosing an electronic device. The case includes a front or top assembly having a transparent, conductive screen film that covers, and allows a user to operate, the touch screen of the enclosed electronic device. The front assembly includes, among other things, a hard plastic polycarbonate frame that encloses the screen film. The rigid plastic frame extends in a direction generally perpendicular to the surface of the screen film to form a wall around the periphery of the front assembly. The screen film and wall include apertures with seals which correspond to, and provide access to, components and controls of the enclosed electronic device. The seals are preferably made from a soft elastomeric material such as rubber, and include button portions that allow the operation of corresponding buttons on the electronic device enclosed within the case.

Apertures corresponding to, e.g., an earpiece, speaker, microphone, and home button of an enclosed electronic device are provided in the front assembly. Each aperture is closed with a corresponding film, preferably a closed cell foam, that is bonded to the inside of the front assembly that faces the enclosed electronic device.

The front assembly mates with a back or bottom assembly to enclose the electronic device. The bottom assembly includes a hard plastic polycarbonate frame which is partially encased by a soft rubber over mold and/or rubber layer. The bottom assembly also includes a bottom surface and curved sidewalls that extend from the bottom surface. Various portions of the bottom assembly are covered by a soft rubber material.

The front assembly is joined to the bottom assembly by fasteners, such as by engagement one or more snap hooks with corresponding snap tabs on the bottom assembly, to enclose the device. Water resistance is provided by both a main seal and a secondary seal formed between sealing members on the front and back assemblies as discussed in more detail below.

Figure 1:
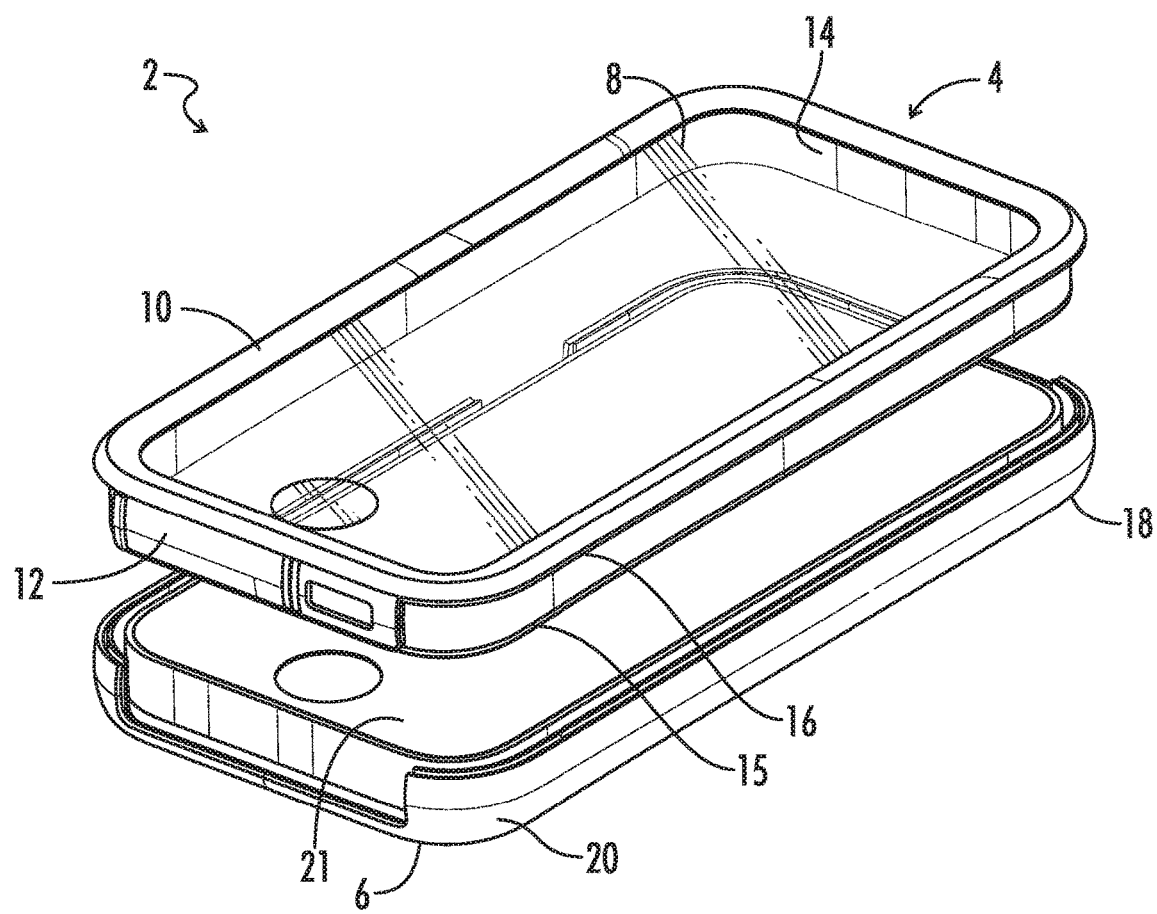
FIG. 1 is an illustration of a device case constructed in accordance with an embodiment of the present invention.

Referring now to FIG. 1, an illustration of a device case constructed in accordance with an embodiment of the present invention is shown. Although a case for a particular device is shown, those skilled in the art will appreciate that the present invention can readily be adapted for a wide variety of different devices. The device case 2 has two primary components, a front cover 4 and a back cover 6.

The front cover 4 includes a screen film 8 that covers the device touchscreen and allows the touchscreen to be used while the device is enclosed within the case 2. The screen film 8 is mounted on a relatively hard and rigid plastic base 10, preferably constructed from a rigid polycarbonate plastic. An elastomeric bottom cover 12, elastomeric inner bumper 14, main elastomeric sealing member 15 and secondary elastomeric sealing member 16 are also mounted on the polycarbonate plastic base 10 of the top cover 4.

The back cover 6 also includes a relatively hard and rigid polycarbonate plastic base 18. The back cover base 18 has an elastomeric outer surface 20 created from a rubber over mold and an elastomeric inner surface 21. The elastomeric components provide padding and shock absorption for the enclosed device while the polycarbonate components improve the rigidity and strength of the case.

Figure 2A:
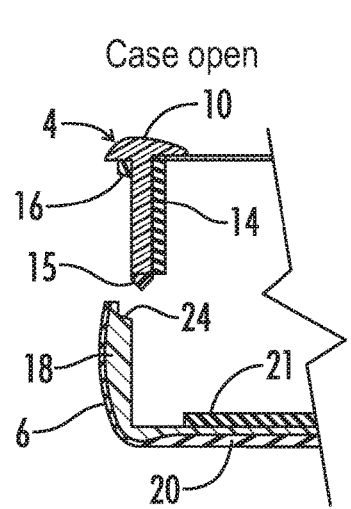
FIGS. 2A-2C are respectively illustrations of the seal of the device case of FIG. 1 in the opened, closing and closed positions.
Figure 2B:
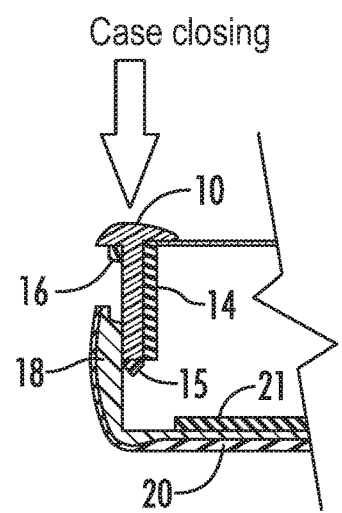
Figure 2C:
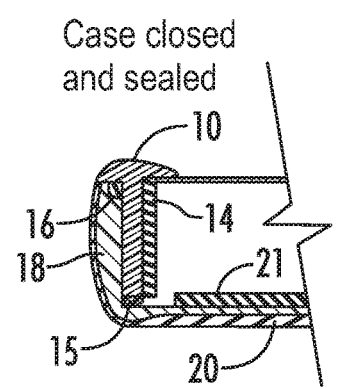

Water resistance is provided by both the main seal 15 and the secondary seal 16. Referring now to FIGS. 2A-2C, illustrations of the seal of the case of FIG. 1 in the opened (FIG. 2A), closing (FIG. 2B) and closed (FIG. 2C) positions are shown. The main seal is formed through the compression of the main sealing member 15 against the rigid polycarbonate base 18 of the back cover 6. The secondary seal is formed through the interaction of the elastomeric secondary sealing member 16 and a corresponding depression 24 in the upper edge of the polycarbonate base 18 which form a water resistant seal around the periphery of the front and back covers.

The case is closed by pressing on the base 10 of the front cover 4 to insert the front cover 4 over the device and into the cavity of the back cover 6 as shown in FIG. 2B. Once the front cover 4 is fully inserted into the back cover 6 as shown in FIG. 2C, the elastomeric main and secondary sealing members 15, 16 of the front cover 4 are engaged with the rigid polycarbonate base 18 of the back cover to form a pair of water resistant seals around the perimeter of the device case.

Figure 3:
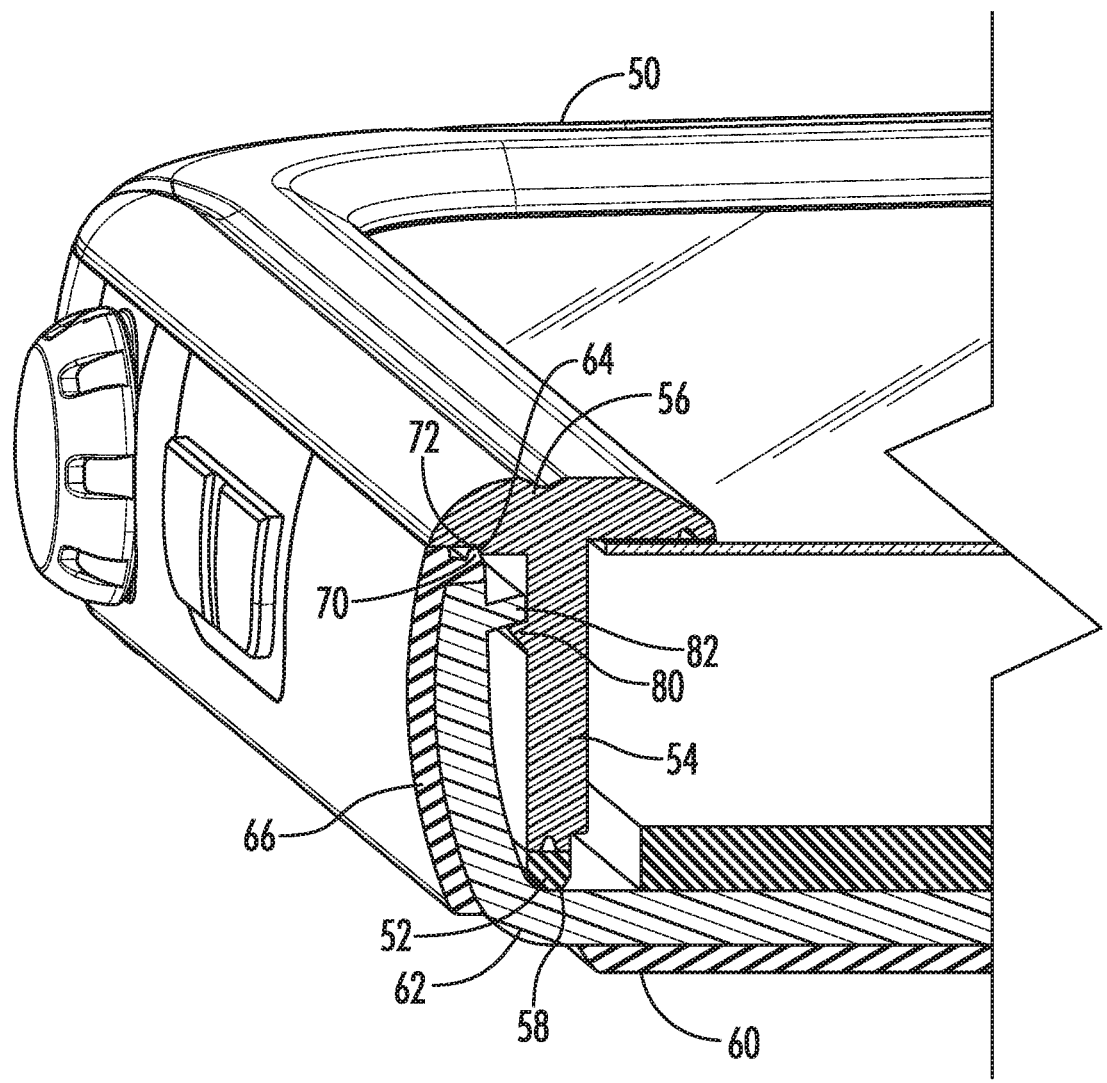
FIG. 3 is an illustration of an alternative secondary seal construction in accordance with an embodiment of the present invention.

An alternative main and secondary seal arrangement for a device case constructed in accordance with an embodiment of the present invention is shown in FIG. 3. In the embodiment shown, the front assembly 50 has a soft, elastomeric compression main or primary seal 52 at or near the bottom of the side walls 54 which extends from the plastic frame 56 of the front assembly for engagement with the inner bottom surface 58 of the bottom assembly 60. When the front and bottom assemblies 50, 60 engage, the compression seal 52 is compressed against the hard plastic bottom frame 62 to form a primary water resistant seal. A secondary swipe seal 64 is formed at the top of the plastic bottom frame 62 between the bottom rubber over mold 66 and front rigid frame 56. The bottom over mold 66 extends inward over the rigid plastic bottom frame 62 and has a vertical protrusion 70 formed thereon. When assembled, the vertical protrusion 70 contacts a flanged inner surface 72 of the front rigid frame 68 to form the swipe seal 64.

The primary and secondary seals 52, 64 are formed upon closing and locking the case. This is accomplished by frictional engagement of the snap hooks 80 on the front assembly with corresponding snap tabs 82 on the bottom assembly. The snap hooks 80 and snap tabs 82 are shaped to force the plastic bottom frame 62, including the snap tabs 82, initially outward as the front and bottom assemblies 50, 60 are joined and the snap hooks 80 and snap tabs 82 come into contact. As this occurs, the swipe seal 64 commensurately flexes outward with the plastic bottom frame 62. As the front and bottom assemblies 50, 60 continue closing together, the snap hooks 80 from the front assembly pass to a position below the snap tabs 82, allowing the plastic bottom frame 62, snap tabs 82, and swipe seal 64 to return to their original position.

Figure 4:
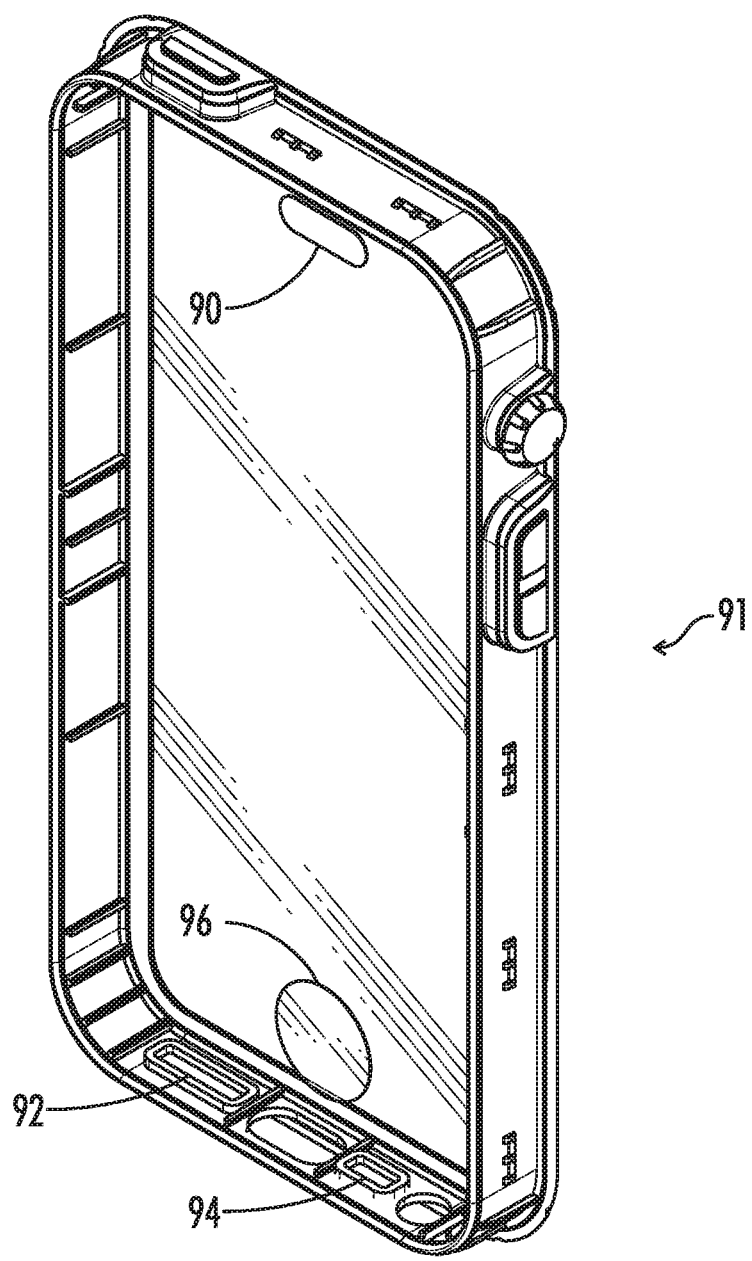
FIG. 4 is an illustration of closed cell foam film seals for a device case constructed in accordance with an embodiment of the present invention.

Referring now to FIG. 4, an illustration of the apertures and protective covers of the front assembly 91 of a device case constructed in accordance with an embodiment of the present invention are shown. As shown in the figure, apertures corresponding to, e.g., an earpiece 90, speaker 92, microphone 94 and home button 96 of an enclosed electronic device are provided in the front assembly 91. Corresponding apertures, not shown, are found on the back assembly so that access to the components of the device can be made through the exterior of the case when the front assembly 91 is mated to the back assembly. Each aperture 90, 92, 94, 96 on the front assembly 91 is closed with a correspondingly shaped film that is bonded to the inside of the front assembly 98 that faces the enclosed electronic device. The film covering the audio apertures 90, 92, 94 is preferably a closed cell foam that allows sound to readily pass through the film while providing water resistance.

Figure 5:
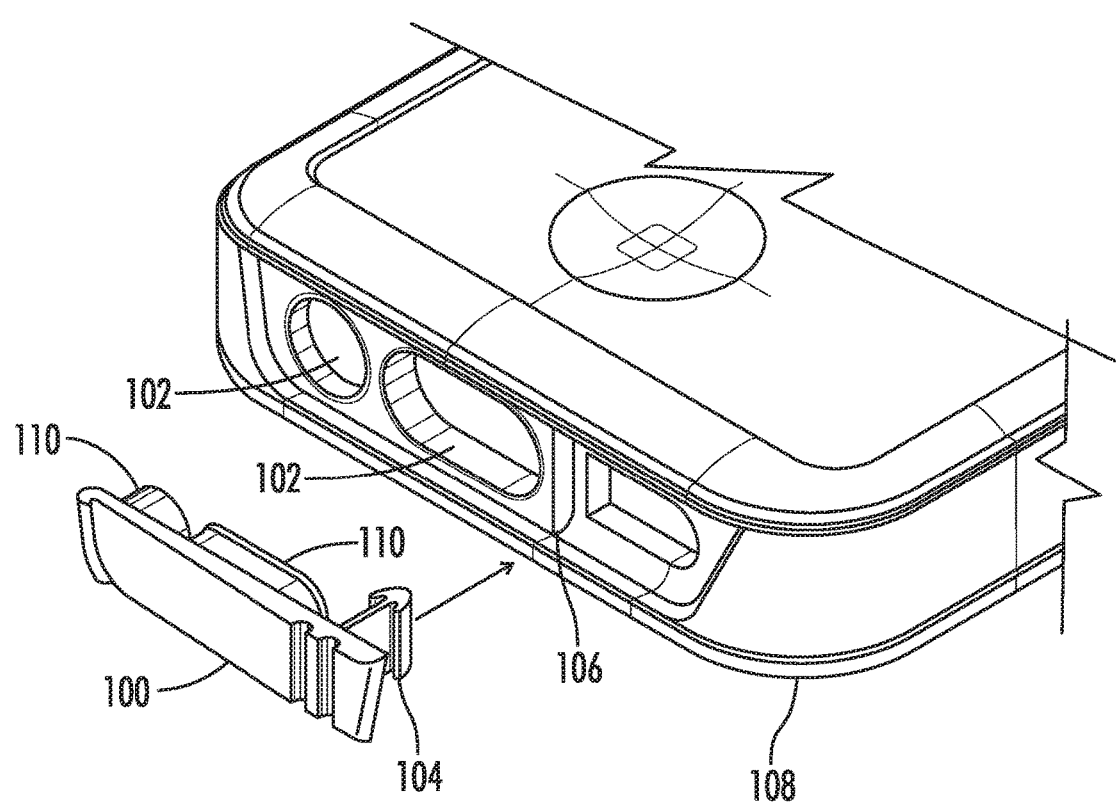
FIG. 5 is an illustration of an elastomeric bottom cover for a device case constructed in accordance with an embodiment of the present invention.

Referring now to FIG. 5, a removable elastomeric cover 100 for the charging and data cable attachment ports of the enclosed device is shown. Apertures 102 are provided through the case assembly 108 such that the ports of the device are exposed. The removable elastomeric cover 100 has plugs 110 that fit into the apertures 102 when the cover 100 is attached to the case assembly 108. A protrusion 104 on the cover is adapted to be inserted into a corresponding slot 106 in the case assembly 108 to removably secure the cover 100 to the case assembly. The protrusion 104 is shaped such that the elastomeric cover 100 is compressed against the case assembly 108 when the cover 100 is attached to the case assembly 108 thereby sealing the apertures 102 in a water resistant manner.

Although there have been described particular embodiments of the present invention of a new and useful water resistant protective device case, it is not intended that such references be construed as limitations upon the scope of this invention except as set forth in the following claims.

What is claimed is:

1. A water resistant protective case configured to enclose a portable electronic device, the protective case comprising:
   a front assembly comprising a rigid front frame having an external facing top surface and an opposing bottom end, a touch screen cover bonded to the rigid front frame, an elastomeric main seal attached around a periphery at the bottom end of the rigid front frame, and a front assembly fastener attached to the rigid front frame; and
   a back assembly comprising a rigid back frame, an elastomeric over mold formed on an exterior of the rigid back frame, and a back assembly fastener attached to the rigid back frame that mates with the front assembly fastener to hold the front assembly and the back assembly together, wherein a main seal is formed around a perimeter of the front and back assemblies by the elastomeric main seal on the front assembly being held against an inner surface of the rigid back frame, and wherein a secondary seal is formed around a perimeter of the front and back assemblies by the front assembly fastener and the back assembly fastener by the front assembly being held against the back assembly, and wherein the elastomeric over mold extends over an upper edge of the rigid back frame and has a sealing protrusion positioned on the upper edge of the rigid back frame.

2. The water resistant protective case of claim 1, wherein the front assembly further comprises an elastomeric secondary sealing member attached around a periphery of the rigid front frame that mates with an exterior surface of the back assembly to form the secondary seal.

3. The water resistant protective case of claim 1, wherein the secondary seal is formed between a surface of the rigid front frame and the elastomeric over mold on the rigid back frame.

4. The water resistant protective case of claim 1, wherein the back assembly fastener further comprises a back assembly snap tab and the front assembly fastener further comprises a front assembly snap hook that snaps over the back assembly snap tab to hold the front assembly and the back assembly together.

5. The water resistant protective case of claim 1, wherein the front assembly and the back assembly further comprise apertures corresponding to audio inputs and outputs of the electronic device and the apertures are covered and sealed by a closed cell foam.

6. The water resistant protective case of claim 1, wherein the front assembly and the back assembly further comprise apertures corresponding to a port of the portable electronic device and the protective case further comprises a removable elastomeric port cover that removably covers the apertures, and wherein the removable elastomeric port cover further comprises an attachment protrusion that creates a compression fit between the removable elastomeric port cover and an exterior of the protective case.

7. The water resistant protective case of claim 1, wherein the rigid front frame of the front assembly is a rigid plastic front frame, and wherein the rigid back frame of the back assembly is a rigid plastic back frame.

8. The water resistant protective case of claim 1 further comprising an elastomeric inner bumper attached to the rigid front frame.

9. The water resistant protective case of claim 1 further comprising an elastomeric inner bumper attached to the rigid back frame.

10. A water resistant protective case adapted to enclose a portable electronic device, the protective case comprising:
a front assembly comprising a rigid front frame having a T-shaped cross-section with a horizontal bar and a vertical bar when taken perpendicularly to the longitudinal direction of the frame, a touch screen cover bonded to the rigid front frame, an elastomeric main seal attached around a periphery at the bottom of the vertical bar of the T-shaped rigid front frame, and a front assembly fastener attached to the rigid front frame; and a back assembly comprising a rigid back frame, an elastomeric over mold formed on an exterior of the rigid back frame, and a back assembly fastener attached to the rigid back frame that mates with the front assembly fastener to hold the front assembly and the back assembly together, wherein a main seal is formed around a perimeter of the front and back assemblies by the elastomeric main seal on the front assembly being held against an inner surface of the rigid back frame, and wherein a secondary seal is formed around a perimeter of the front and back assemblies by the front assembly fastener and the back assembly fastener by the front assembly being held against the back assembly.

11. The water resistant protective case of claim 10, wherein the front assembly further comprises an elastomeric secondary sealing member attached around a periphery of the rigid front frame that mates with an exterior surface of the back assembly to form the secondary seal.

12. The water resistant protective case of claim 10, wherein the secondary seal is formed between a surface of the rigid front frame and the elastomeric over mold on the rigid back frame.

13. The water resistant protective case of claim 10, wherein the elastomeric over mold extends over an upper edge of the rigid back frame and has a sealing protrusion positioned on the upper edge of the rigid back frame.

14. The water resistant protective case of claim 10, wherein the back assembly fastener further comprises a back assembly snap tab and the front assembly fastener further comprises a front assembly snap hook that snaps over the back assembly snap tab to hold the front assembly and the back assembly together.

15. The water resistant protective case of claim 10, wherein the front assembly and the back assembly further comprise apertures corresponding to audio inputs and outputs of the electronic device and the apertures are covered and sealed by a closed cell foam.

16. The water resistant protective case of claim 10, wherein the front assembly and the back assembly further comprise apertures corresponding to a port of the portable electronic device and the protective case further comprises a removable elastomeric port cover that removably covers the apertures, and wherein the removable elastomeric port cover further comprises an attachment protrusion that creates a compression fit between the removable elastomeric port cover and an exterior of the protective case.

17. The water resistant protective case of claim 10, wherein the rigid front frame of the front assembly is a rigid plastic front frame, and wherein the rigid back frame of the back assembly is a rigid plastic back frame.

18. The water resistant protective case of claim 10 further comprising an elastomeric inner bumper attached to the rigid front frame.

19. The water resistant protective case of claim 10 further comprising an elastomeric inner bumper attached to the rigid back frame.

* * * * *